Oct. 24, 1961  J. SZYDLOWSKI  3,005,668
METHOD OF AND DEVICE FOR RELIEVING SHAFT VIBRATION
Original Filed Oct. 19, 1953  2 Sheets-Sheet 1

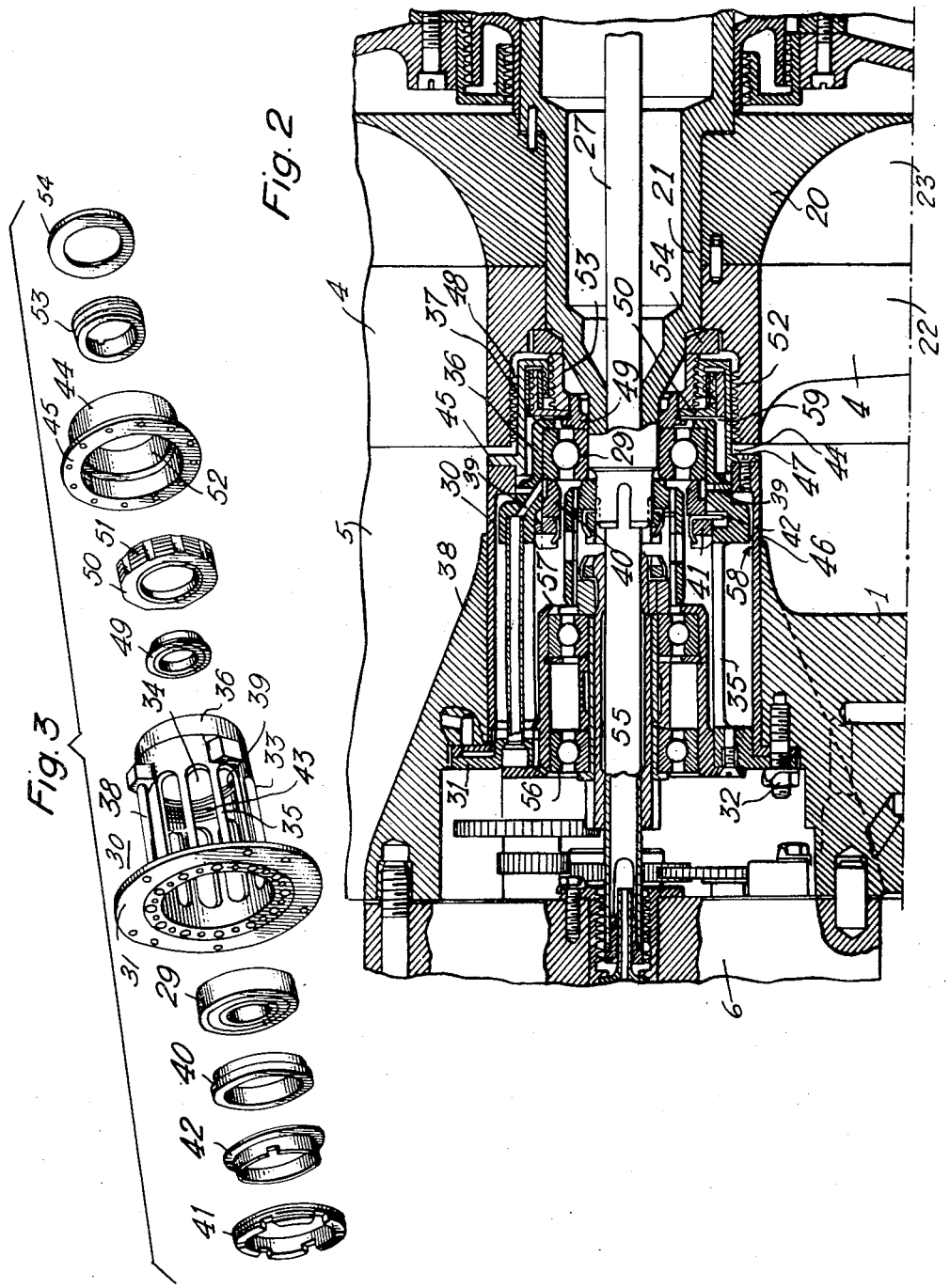

United States Patent Office 3,005,668
Patented Oct. 24, 1961

3,005,668
METHOD OF AND DEVICE FOR RELIEVING SHAFT VIBRATION
Joseph Szydlowski, Basses-Pyrénées, Usine Turbomeca, Bordes, France
Original application Oct. 19, 1953, Ser. No. 386,761, now Patent No. 2,922,278, dated Jan. 26, 1960. Divided and this application July 24, 1958, Ser. No. 750,737
2 Claims. (Cl. 308—184)

This application is a division of application Serial No. 386,761 filed October 19, 1953, now Patent No. 2,922,278.

This invention relates to improvements in power plants incorporating groups provided with shafts rotary driven at high rotary speeds in their operative range and more particularly those that form turbo-engines.

The main object of the present invention is to provide a method of and a device for relieving the vibrations for the shafts rotary driven at high rotary speeds in their operative range.

Another object of the present invention is to provide means for avoiding a whipping of a shaft of the character described when the operation range of the engine incorporating said shaft covers a critical vibration period thereof.

The following description made with reference to accompanying drawings and given solely by way of exemplification and by no means in a limiting sense will allow the invention to be properly understood together with various advantageous features thereof. In said drawings:

FIG. 2 is an enlarged axial sectional view illustrating the front bearing in the group shown in FIG. 1.

FIG. 3 is an exploded view in perspective showing the component parts constituting the front bearing shown in FIG. 2.

Figure 1:
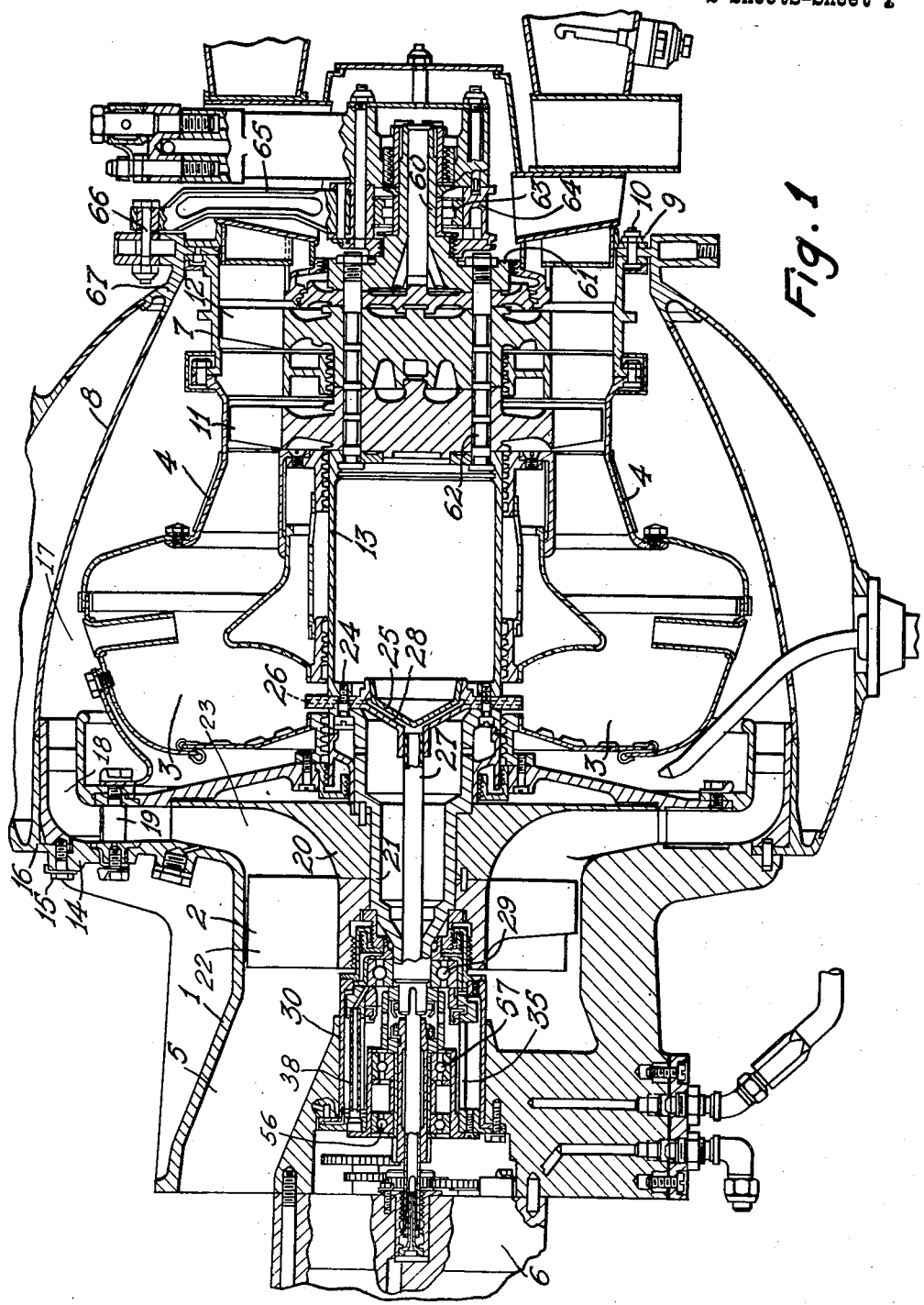
FIG. 1 is an axial sectional view of a turbo-propelling group incorporating a combustion gas turbine.

The gas turbine group of FIG. 1 comprises a compressor casing 1 containing an impeller type air compressor 2 for feeding air into the combustion chamber 3. A hollow diffuser 4 is provided at the outlet of the combustion chamber for the exhaust gases.

The axial annular input nozzle for the compressor 2 is indicated at 5 and the casing wherein the various auxiliary elements are located, such as a starter, fuel pump, oil pump and a regulator for the fuel delivery is shown at 6.

The turbine casing 7 is connected with the combustion chamber double walled casing 8 at 9 by the bolts 10. The turbine casing 7 is also connected to the hollow diffuser 5. Turbine wheels 11 and 12 are fixed to the hollow central shaft 13. The rear terminal surfaces of the turbine wheels 11 and 12 face the gaseous output stream and fluid tight means are mounted towards the rear forming a bearing and a labyrinthic system.

The combustion chamber 3 is located within the casing 8 surrounding the rotary shaft 13.

The compressor casing 1 is provided with a radially outwardly directed flange 14 to which the double walled casing 8 is secured by the bolts 15. The bolts 15 also secure in position an annular flange member 16 which directs the air coming from the compressor 2 from a radial direction to an axial direction into the passage 17 located between the inner surface of the casing 8 and the combustion chamber. The annular passage 18 communicating with the passage 17 is provided with a diffuser 19 for the compressed air. The diffuser 4 is fixed to the casing 8 through the casing 7 for the turbine wheels.

The compressor 2 comprises the hub portion 20 which is secured to the hollow shaft 21 which in turn is fixed to the hollow shaft 13 and is of reduced diameter. The compressor 2 comprises the axially extending portion of the vanes 22 and the vanes 23 extending axially at the inlet and then extending radially outwardly towards the passage 18.

The hollow shaft 21 is bolted to the hollow shaft 13 by means of the bolts 24 which extend through an outwardly directed flange upon the rear end of the shaft 21 and an inwardly directed flange upon the front end of the shaft 13. In between the flanges upon the shafts 21 and 13 there is clamped the slinger type fuel injector 25 which is also secured by means of the bolts 24. The slinger 25 is provided with the outlet bores 26 which are fed from the fuel line 27 feeding the passages 28 leading to the bores 26.

The combustion chamber 3 is of the type disclosed in my copending patent application Serial No. 386,761 filed October 19, 1953, of which the present application is a division.

The engine as described above has an operating range between 30,000 and 35,000 r.p.m. It also has two critical vibration periods with the first at about 32,000 r.p.m. and the second at about 42,000 r.p.m. A whipping of the shaft is therefore liable to occur since the operating range of the engine covers the first critical vibration period. In order to overcome this the front bearing of the engine is mounted in a cantilever construction which gives the requisite flexibility so as to bring the first critical vibration period from about 32,000 r.p.m. down to about 24,000 r.p.m. which brings such first critical vibration sufficiently below the operating range of the engine. The operation range of the engine will never reach the second critical vibration period.

Referring to FIGURES 2 and 3 this special construction for supporting the front bearing 29 of the engine is a cage construction 30 which comprises a front plate 31 which is secured to the casing 1 by means of bolts 32. Secured to the plate 31 is the cylindrical cage member 33 having the elongated slots 34 therein which define flexible ribs 35. At the rear the cage member 33 is reduced in diameter as shown at 36 and the rearward edge of the reduced portion is turned inwardly to form a flange 37. The bearing 29 is seated within the reduced portion 36 of the cage member 33.

Also associated with the cage construction is an oil tube 38 which is connected with the oil supply for feeding oil through the channel 39 to the bearing 29.

The forward end of the bearing 29 is retained in position against the flange 37 by the ring 40 which in turn is secured in position by the castellated ring nut 41 with the shim 42 interposed. The threaded nut 41 cooperates with the threads 43 provided upon the interior of the cage immediately in front of the reduced portion thereof.

A labyrinthine construction is provided rearwardly of the bearing 29 and comprises the ring 44 having a flange 45 which is bolted to a cylindrical member or liner 46 enclosing the cantilever mounting of the front bearing by the screws 47. The cylindrical member 46 is secured to the frame 1 by the bolts 32 which secure the cantilever mounting. An interior surface of the hub of the vanes 22 is provided with the labyrinthic sealing means 48 which cooperate with the exterior surface of the ring 44.

Abutting the rear end of the bearing 29 is a ring member 49 defining a clearance with the inwardly turned flange 37 of the cage member 33 and mounted on the rearward reduced portion of the ring member 49 is a ring shaped member 50 having labyrinthic sealing means 51 on the outer surface thereof which cooperates with a surface 52 upon the inner surface of the member 44. The member 44 at its rearward end is provided with a flange directed forwardly of the engine and with this flange the labyrinthic seal 53 cooperates. A spacing member 54 abuts the member 53 at its rearward end and at its other side abuts a reduced portion upon the shaft 21.

The shaft 21 drives the shaft 55 for the auxiliary elements of the engine and for taking off power. The shaft 55 is mounted in the bearings 56 and 57.

A clearance of .020 to .030 inch is provided between the cantilever housing and the cantilever mounting at the points 58 and 59. This clearance is generally sufficient to allow whipping and the clearance at the point 59 may be less than that provided at the point 58.

Oil is supplied to the various locations under pressure as desired and the labyrinthic sealing means utilized provide proper sealing.

The stub shaft 60 is provided with a flange 61 which in turn is connected by the bolts 62 to the turbine wheels 11 and 12 and to the hollow shaft 13. Said stub shaft 60 is supported by a rear bearing 63 the support 64 of which is carried by links 65 pivotally secured to the spindles 66 which are mounted upon the ring 67 at the rear end of the casing 8.

What I claim is:

1. In a power plant having a rotary shaft and a casing, the combination of a multiplicity of bearings through which said shaft rotates and, for one of said bearings, a cantilever mounting comprising a substantially cylindrical metallic cage secured at one of its ends to the power plant casing and the other end of which acts as a seat for receiving said bearing, said cage through which the shaft passes having elongated slots in the wall thereof between its two ends in order to change the normal critical vibration of said shaft and take it out of the normal operating speed range of said power plant, and a cantilever housing enclosing said cantilever mounting with sufficient clearance to allow whipping of said shaft and connected to said mounting at the end thereof which is secured to the power plant casing.

2. In a power plant having a rotary shaft and a casing, the combination of a multiplicity of bearings through which said shaft rotates and, for one of said bearings, a cantilever mounting comprising a substantially cylindrical metallic cage secured at one of its ends to the power plant casing and the other end of which acts as a seat for receiving said bearing, said cage through which the shaft passes having elongated slots in the wall thereof between its two ends in order to change the normal critical vibration of said shaft and take it out of the normal operating speed range of said power plant, and a cantilever housing enclosing said cantilever mounting with sufficient clearance to allow whipping of said shaft and connected to said mounting at the end thereof which is secured to the power plant casing, said clearance being of the order of .020 to .030 of an inch.

References Cited in the file of this patent

UNITED STATES PATENTS

| | | |
|---|---|---|
| 2,521,638 | Lamm | Sept. 5, 1950 |
| 2,534,738 | Scott | Dec. 19, 1950 |
| 2,603,540 | Mierley et al. | July 15, 1952 |
| 2,625,790 | Petrie | Jan. 20, 1953 |
| 2,628,766 | Rydmark | Feb. 17, 1953 |
| 2,698,131 | Cook | Dec. 28, 1954 |
| 2,698,772 | Roberts | Jan. 4, 1955 |
| 2,726,070 | Tudor | Dec. 6, 1955 |